(12) United States Patent
Previero

(10) Patent No.: US 9,776,343 B2
(45) Date of Patent: Oct. 3, 2017

(54) APPARATUS AND METHOD FOR SEPARATING MATERIALS OF VARIOUS TYPE

(71) Applicant: PREVIERO N. S.R.L., Monza Brianza (IT)

(72) Inventor: Flavio Previero, Monza Brianza (IT)

(73) Assignee: PREVIERO N. S.R.L., Lissone, Monza Brianza (IT)

( * ) Notice: Subject to any disclaimer, the term of this patent is extended or adjusted under 35 U.S.C. 154(b) by 0 days.

(21) Appl. No.: 15/031,566

(22) PCT Filed: Nov. 20, 2014

(86) PCT No.: PCT/IB2014/066197
§ 371 (c)(1),
(2) Date: Apr. 22, 2016

(87) PCT Pub. No.: WO2015/075663
PCT Pub. Date: May 28, 2015

(65) Prior Publication Data
US 2016/0263777 A1  Sep. 15, 2016

(30) Foreign Application Priority Data
Nov. 21, 2013  (IT) .............................. MI2013A1941

(51) Int. Cl.
*B29B 17/02* (2006.01)
*C08J 11/06* (2006.01)
*B29K 67/00* (2006.01)

(52) U.S. Cl.
CPC ............... *B29B 17/02* (2013.01); *C08J 11/06* (2013.01); *B29B 2017/0203* (2013.01); *B29B 2017/0255* (2013.01); *B29B 2017/0258* (2013.01); *B29K 2067/003* (2013.01); *C08J 2367/02* (2013.01); *Y02W 30/622* (2015.05)

(58) Field of Classification Search
CPC ...................................... B29B 17/02

USPC ........................................................... 521/48
See application file for complete search history.

(56) References Cited

U.S. PATENT DOCUMENTS

| | | |
|---|---|---|
| 5,053,091 A | 10/1991 | Giljam et al. |
| 5,267,845 A | 12/1993 | Anderlind et al. |
| 5,303,826 A | 4/1994 | Buzga |
| 5,573,790 A | 11/1996 | Wehtje et al. |
| 5,660,282 A | 8/1997 | Djerf et al. |
| 5,794,861 A | 8/1998 | Rutherford, Sr. |
| 2012/0318155 A1 | 12/2012 | Fappiano et al. |

FOREIGN PATENT DOCUMENTS

| | | |
|---|---|---|
| EP | 2 537 678 A1 | 12/2012 |
| JP | H-11-226957 A | 8/1999 |

OTHER PUBLICATIONS

International Search Report (PCT/ISA/210) issued on Mar. 16, 2016, by the European Patent Office as the International Searching Authority for International Application No. PCT/IB2014/066197.
Written Opinion (PCT/ISA/237) issued on Mar. 16, 2016, by the European Patent Office as the International Searching Authority for International Application No. PCT/IB2014/066197.

*Primary Examiner* — Terressa Boykin
(74) *Attorney, Agent, or Firm* — Buchanan Ingersoll & Rooney PC

(57) ABSTRACT

A method for separating materials of various type having different softening temperature values, includes pouring a mixture of flakes and fragments of materials on a movable receiving and conveying device in a uniformly distributed manner and advancing it along a first portion of path; actuating an electromagnetic inductor to heat an outer metal surface by electromagnetic induction, which surface is included in the movable receiving and conveying device to achieve a first lower softening temperature corresponding to a first material of the mixture; subjecting the mixture to a separating action during which a first fraction, remains stuck to the outer metal surface, whereas a remaining second fraction of materials having higher softening temperatures than the first softening temperature freely slips by gravity towards a lower receiving zone.

26 Claims, 13 Drawing Sheets

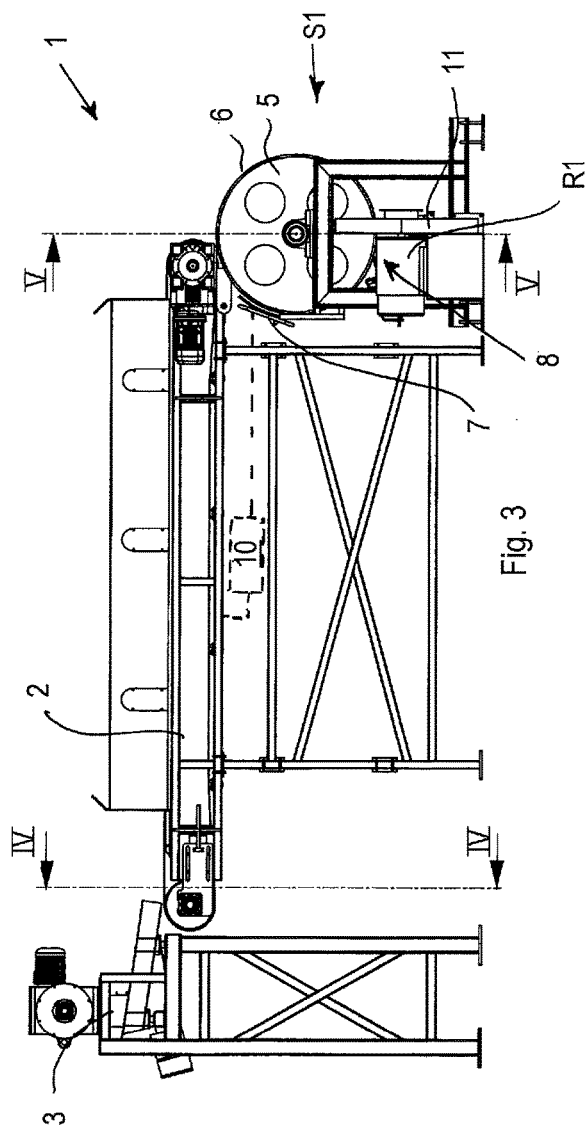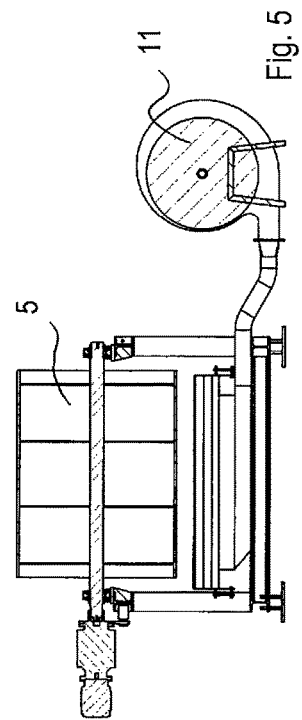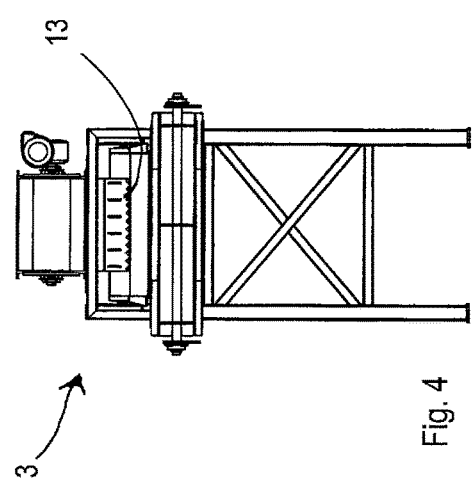

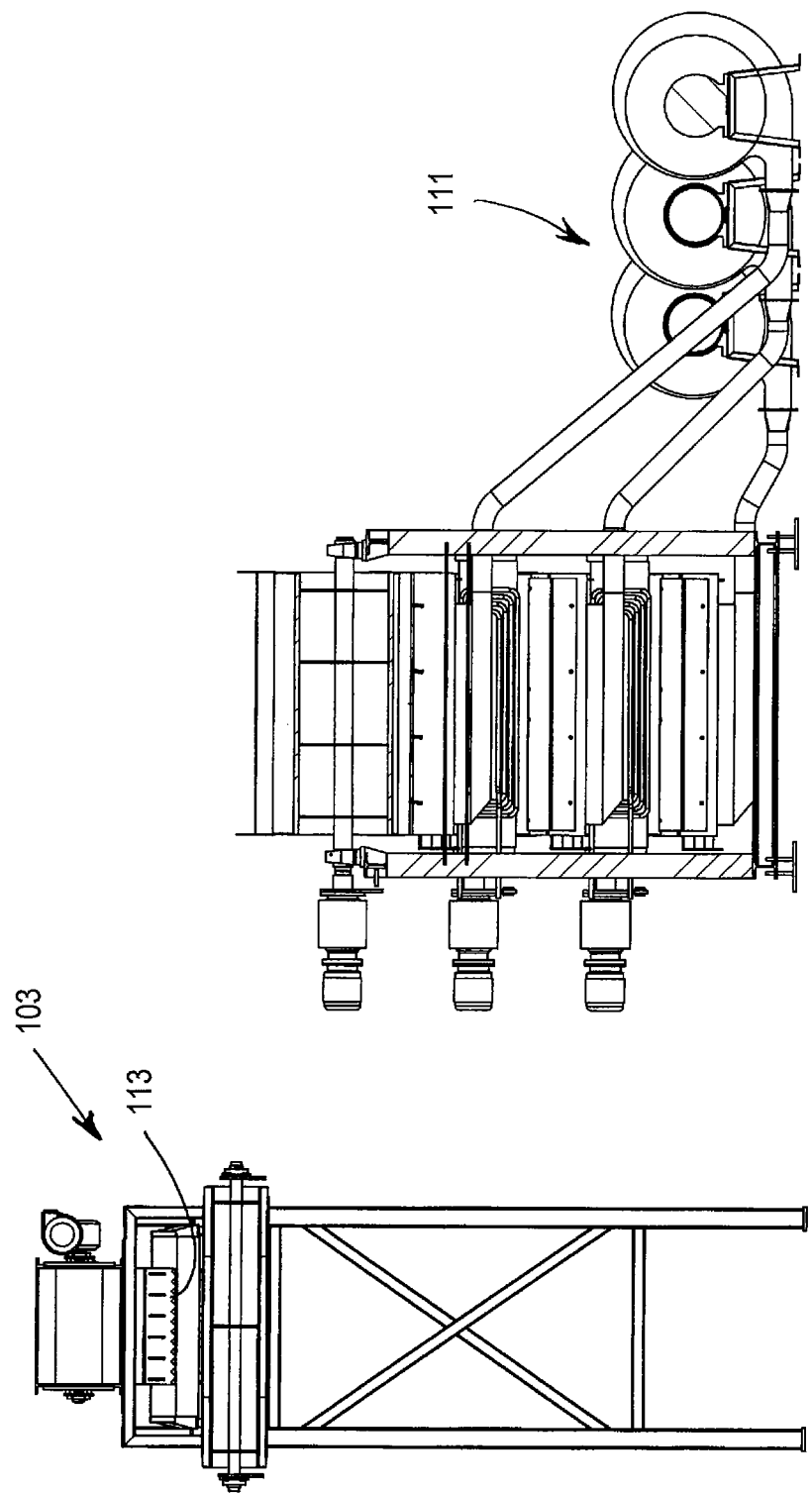

APPARATUS AND METHOD FOR SEPARATING MATERIALS OF VARIOUS TYPE

BACKGROUND OF THE INVENTION

The present invention relates to an apparatus and a method allowing to separate materials of various type based on the different respective softening temperatures.

The apparatus and the method are particularly useful in the field of treating and recycling of plastics materials obtained from post-consumption objects, such as polyethylene terephtalate PET and other materials, from which substances and/or further contaminant materials are to be removed.

BACKGROUND OF THE ART

For recycling plastics materials, particularly PET, it is known to grind objects such as post-consumption bottles or containers, such as to obtain a mixture of materials in the form of flakes or fragments. This mixture, in addition to the prevailing amount of PET material, also inevitably contains a certain amount of contaminating substances or materials which affect the recycled product obtained. The presence of these contaminating materials beyond a certain tolerated limit results in the recovery plastics material having an industrially unsatisfactory pureness degree.

The contaminating substances very often include polymeric materials such as poly vinyl chloride (PVC), acrylic materials, polystyrene and so-called "low-melting" materials, i.e. having relatively lower melting temperatures and softening temperatures than PET, where the softening temperature is intended as the temperature at which the material achieves a certain state of fluidity, thereby acquiring a soft or pasty consistency.

It is thus necessary to separate these "low-melting" materials from the PET. To the purpose, separating systems are presently used comprising a conveyor belt which receives said mixture of flakes and fragments and is heated, by means of hot air flows dispensed by suitable internally-arranged nozzles. The flakes of low-melting material, particularly of PVC, in contact with the hot belt progressively acquire a soft or pasty consistency, which causes them to become sticky. Through this adhesive effect, only the PVC particles, and not the PET flakes, are caused to adhere to the belt. Thereby, the aim is to allow the PET flakes to drop from the belt to a suitable collection area after they have reached the end of the conveyor belt, whereas the PVC fragments are still maintained adherent to the belt for a further portion of path. A suitable scraper is provided to remove the PVC fragments from the belt.

Drum separation systems are also known, which are heated from the inside by means of hot liquids or hot air, at such temperatures as to cause the softening of the low-melting materials to be removed. Similarly to the above-described belt systems, suitable scrapers remove the fragments of low-melting material attached to the drums, whereas the PET flakes are allowed to drop freely in a separate zone.

Systems for separating different materials are, for example, known from U.S. Pat. No. 5,303,826 and U.S. Pat. No. 5,660,282.

The prior art systems described above entail limits both from the operational and versatility point of view and from structural and constructive point of view.

Particularly, both in the case of the conveyor belt and in the case of the drum system, the hot air heating should be necessarily provided from the inside in order to prevent the lighter mixture particles from being swept away from the supporting and advancement surfaces on which they are laid, and this implies that quite complex internal circuits should be provided for the hot air. Furthermore, the use of hot air to heat the surfaces of the belt or drums entails a considerable energy consumption. Generally, the hot air heating system has a number of difficulties both in terms of construction and in terms of management and operation. Furthermore, in the currently known systems, the scraping action often leads to unsatisfactory results. In fact, often the low-melting materials reach the scrapers in a still soft and pasty state because they are still hot, and instead of being detached by the scrapers they tend to remain at least partially attached to and spread on the surface of the belt or roll thereby negatively affecting the proper operation of the equipment and the quality, in general, and efficacy of the material recovery process.

Accordingly, there is a need to research a technical solution which allows overcoming the inherent limitations of the conventional separation systems described above.

OBJECTS OF THE INVENTION

An object of the present invention is to provide a method and an apparatus which provide a general improvement in the separation of recyclable materials, compared to the known systems.

Another object is to structurally simplifying the systems for separating the recyclable materials, thereby making them cost-effective in terms of construction and operation, and ensuring a high level of separation and purity of the plastics material being recovered while achieving a higher energy efficiency than the prior art systems currently used.

BRIEF DESCRIPTION OF THE INVENTION

These and further objects and advantages of the invention can be achieved by means of a method according to claim 1, and an apparatus according to claim 12.

According to a first aspect of the invention, a method is provided for separating materials of various type having different softening temperature values, comprising the steps of:

pouring a mixture of flakes and fragments of said materials onto movable receiving and conveying means in an uniformly distributed manner, and advancing said mixture along a first portion of path;

actuating electromagnetic inductor means in order to heat an outer metal surface by means of electromagnetic induction, which surface is included in said movable receiving and conveying means, such as to reach a first lower softening temperature corresponding to a first material included in said mixture, subjecting said mixture to a separating action during which a first fraction of said mixture composed of said first material, adheres to said outer metal surface due to the soft or pasty consistency thereof, which is acquired upon contact with said outer metal surface heated at said first softening temperature, said first fraction of mixture remaining stuck to said outer metal surface along a second portion of path whereas the remaining part of said mixture, which defines a second fraction composed of materials having softening temperatures higher than said first softening temperature slips away from said outer metal surface by gravity along a third portion of path and falls freely to a receiving zone located below, removing by scraping away said first fraction of mixture from said outer metal surface and receiving said removed first fraction in a collection zone which is separated from said receiving zone and dedicated to said first material, CHARACTERISED IN THAT before said scraping the following is provided:

directing a jet of refrigerating-cleaning-substance comprising air and carbon dioxide (CO2) at a low temperature to said first fraction of mixture advancing along said second portion of path, such as to cool and solidify said first fraction of mixture in order to promote the detachment of the latter from said outer metal surface.

Particularly, in an embodiment of the method a step of cryogenic sandblasting is provided, in which the used refrigerating-cleaning-substance X comprises air and carbon dioxide (CO2) particles in the solid state (dry ice). According to another embodiment of the method, the used refrigerating-cleaning-substance X comprises air and carbon dioxide snow.

In a second aspect of the invention, an apparatus is provided for separating materials of various type having different softening temperature values, comprising:

receiving and conveying means configured to support and advance a mixture of flakes and fragments of said materials along a first portion of path, and comprising a metal outer surface suitable to receive said mixture;

supplying-distributing means configured to pour and uniformly distribute said mixture onto said receiving and conveying means, heating electromagnetic inductor means to heat said metal outer surface by means of electromagnetic induction, such as to reach a first lower softening temperature corresponding to a first material included in said mixture;

control means to actuate and adjust said electromagnetic inductor means at a softening temperature of a first material included in said mixture, such as to maintain the adhesion of said first material to said metal outer surface (6; 106) along a second portion of path due to the effect of the soft or pasty consistency acquired by means of the heating action, scraping means to remove a first fraction of mixture composed of said first material from said metal outer surface in order to direct it to a dedicated collection zone;

said receiving and conveying means being configured to cause, during the advancement, the fall by gravity, along a third portion of path, of a remaining part of mixture defining a second fraction composed of one or more materials having softening temperatures higher than said first softening temperature,

CHARACTERISED IN THAT IT COMPRISES dispensing and treatment means being configured to direct a jet of refrigerating-cleaning-substance comprising air and carbon dioxide at low temperature to said first fraction of mixture advancing along said second portion of path, in order to cool and solidify said first fraction of mixture such as to promote the detachment of the latter from said outer metal surface.

By means of the method and apparatus according to the invention, a general improvement in the separation of recyclable materials is obtained, and a considerable reduction in the energy consumption related to the process as well as a high level of separation and purity of the plastic material being recovered are achieved. Reducing the energy consumption also results in advantages in terms of impact on the environment.

BRIEF DESCRIPTION OF THE DRAWINGS

Further characteristics and advantages will appear from the description below in connection with the annexed drawings which show several exemplary and non-limiting embodiments of the apparatus according to the invention, wherein

FIG. 3 is a side view of the apparatus in FIG. 1;

FIG. 4 is a section taken along the plane IV-IV in FIG. 3;

FIG. 5 is a section taken along the plane V-V in FIG. 3;

FIG. 12 is a section taken along the plane XII-XII in FIG. 10;

FIG. 13 is a section taken along the plane XIII-XIII in FIG. 10;

DETAILED DESCRIPTION OF THE INVENTION

Figure 1:
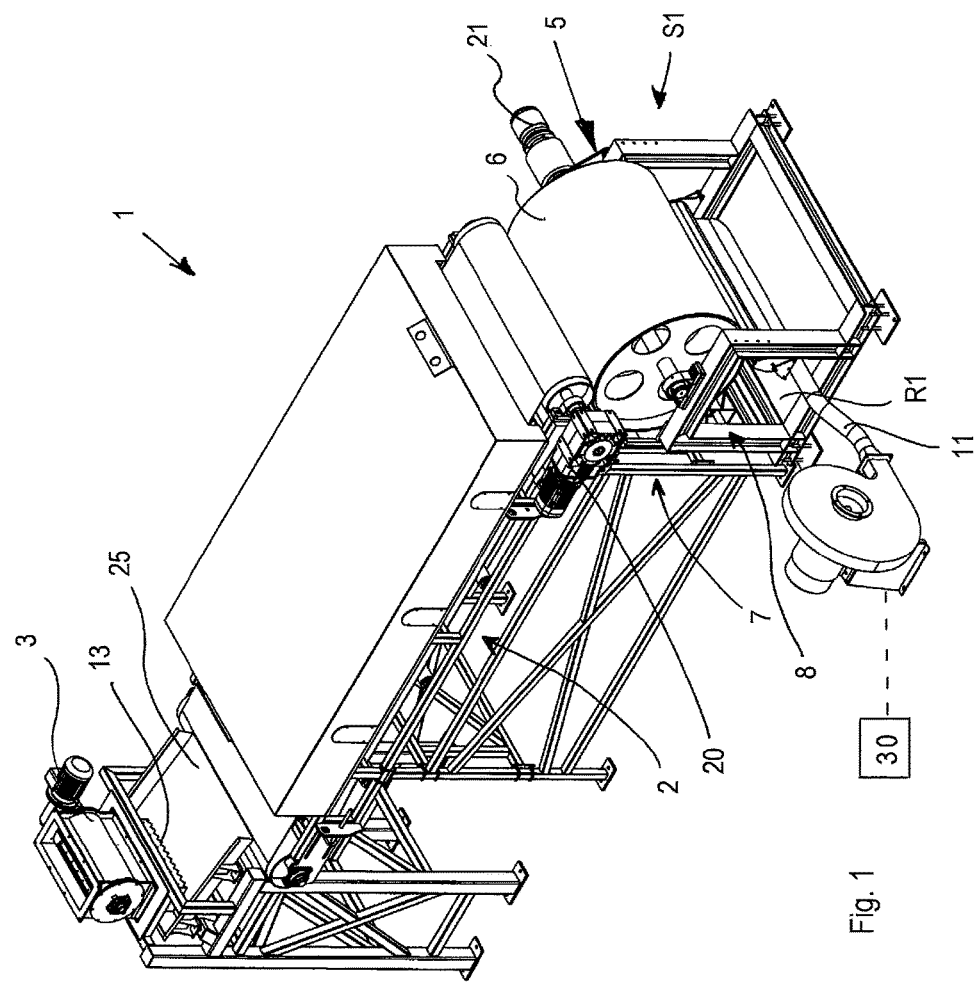
FIG. 1 is a perspective view of a first embodiment of apparatus according to the invention.
Figure 2:
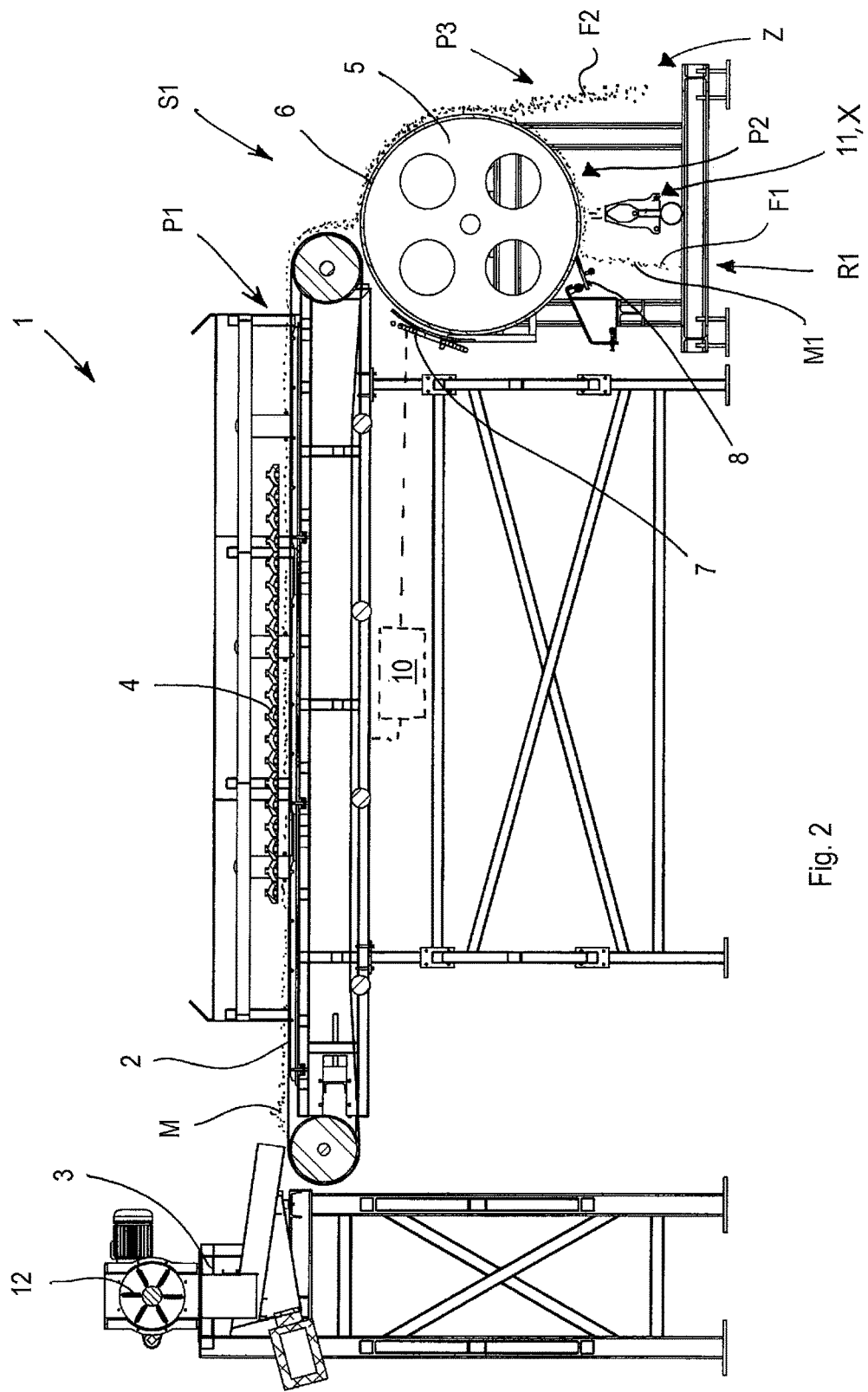
FIG. 2 is a longitudinal section of the apparatus in FIG. 1.
Figure 6:
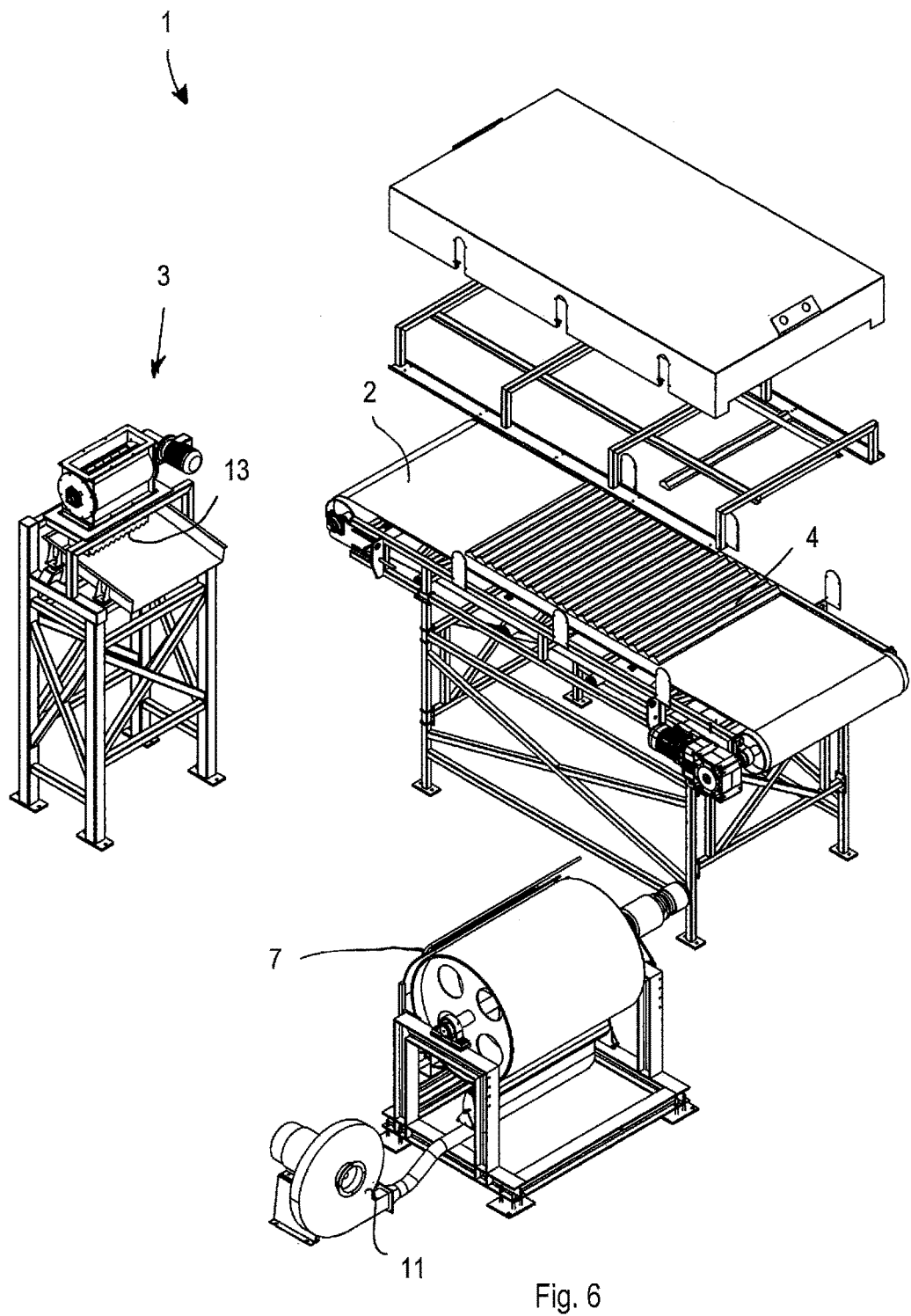
FIGS. 6 and 7 are two different partially exploded views of the apparatus in FIG. 1.
Figure 7:
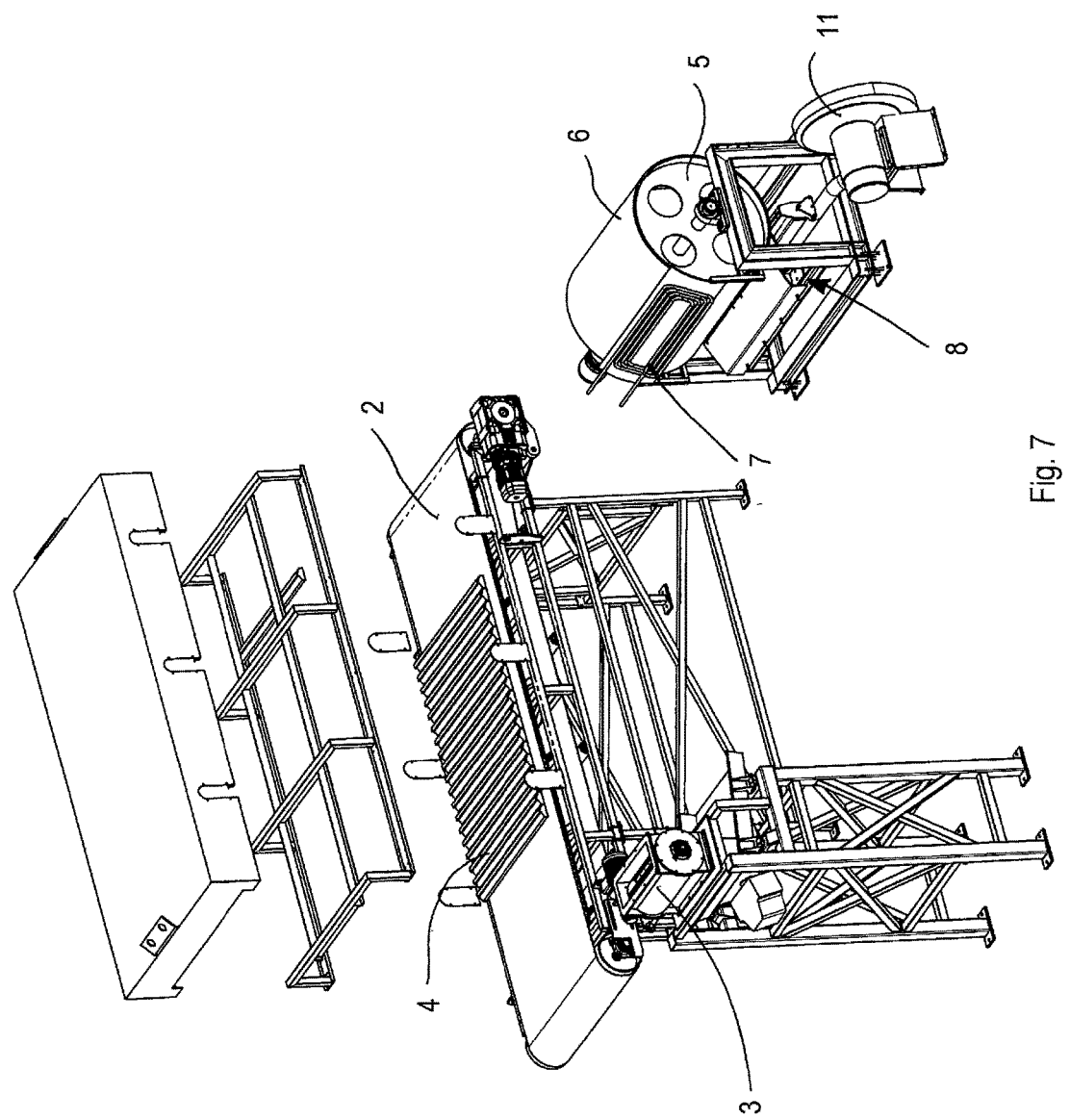
Figure 8:
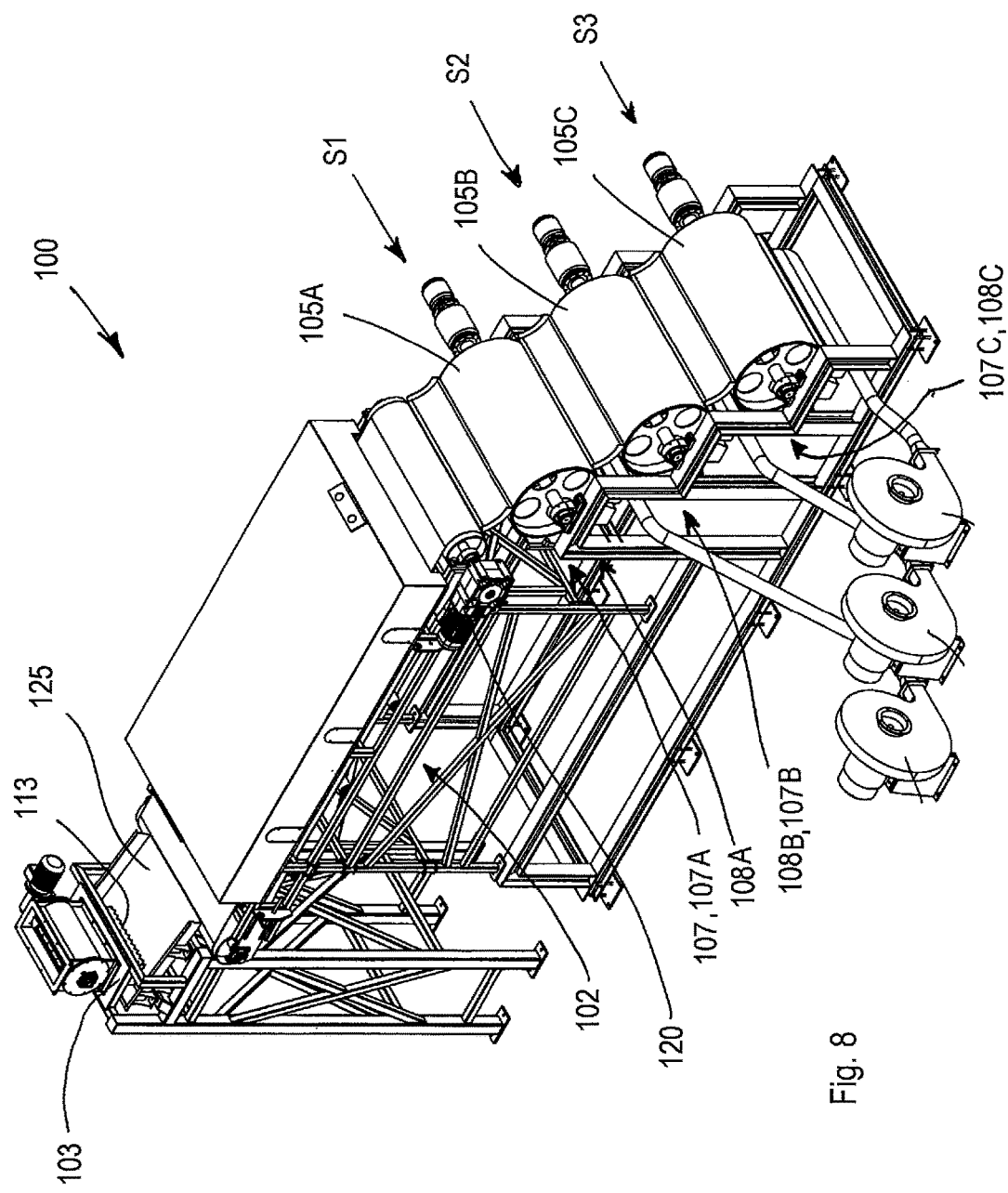
FIG. 8 is a perspective view of a second embodiment of the apparatus according to the invention.
Figure 9:
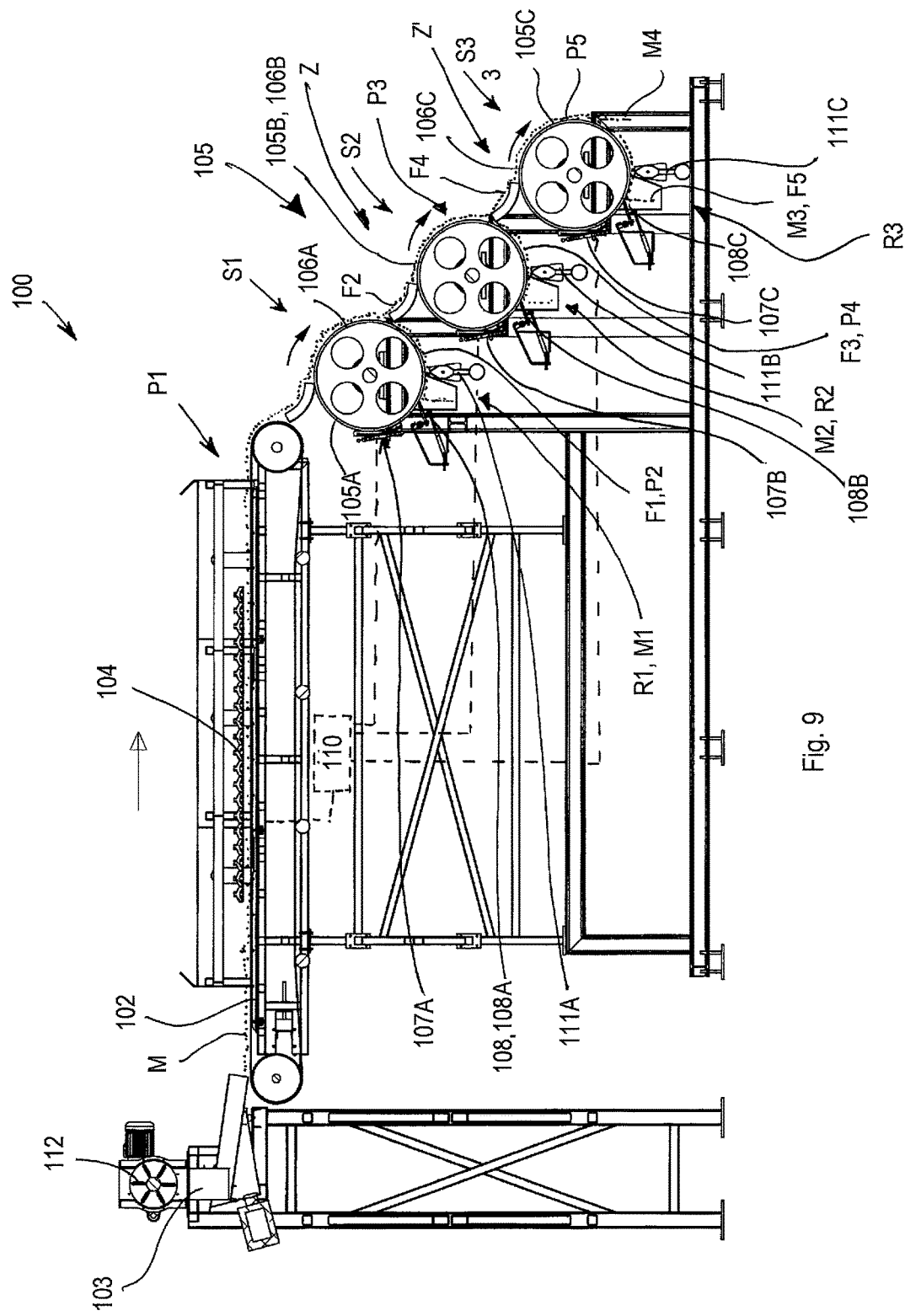
FIG. 9 is a longitudinal section of the apparatus in FIG. 8.
Figure 10:
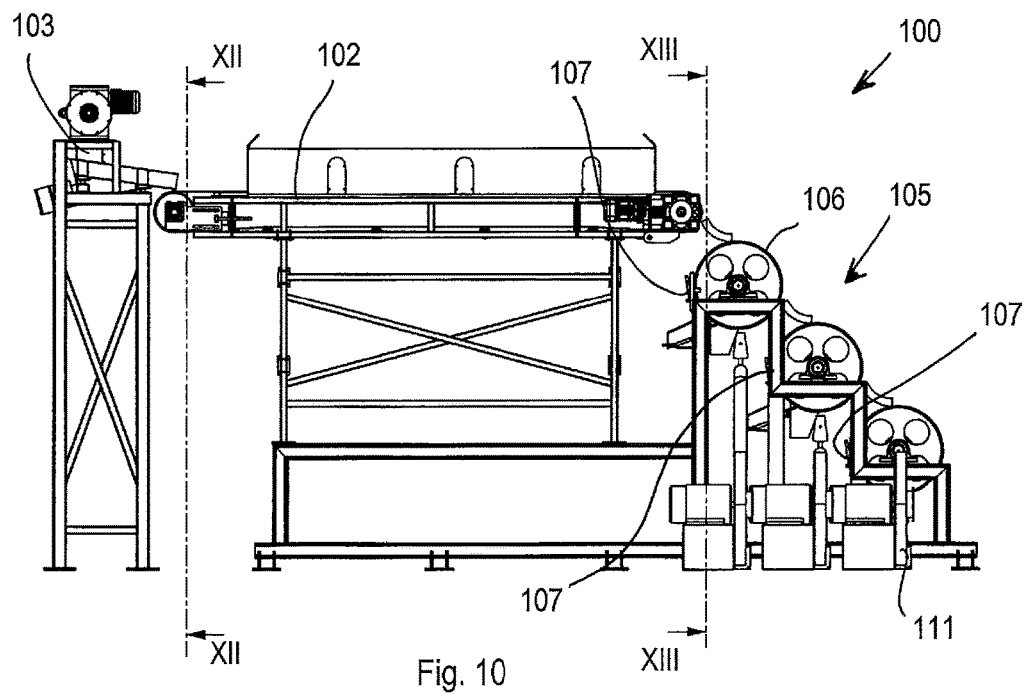
FIGS. 10 and 11 are respectively a side view and a top view of the apparatus in FIG. 8.
Figure 11:
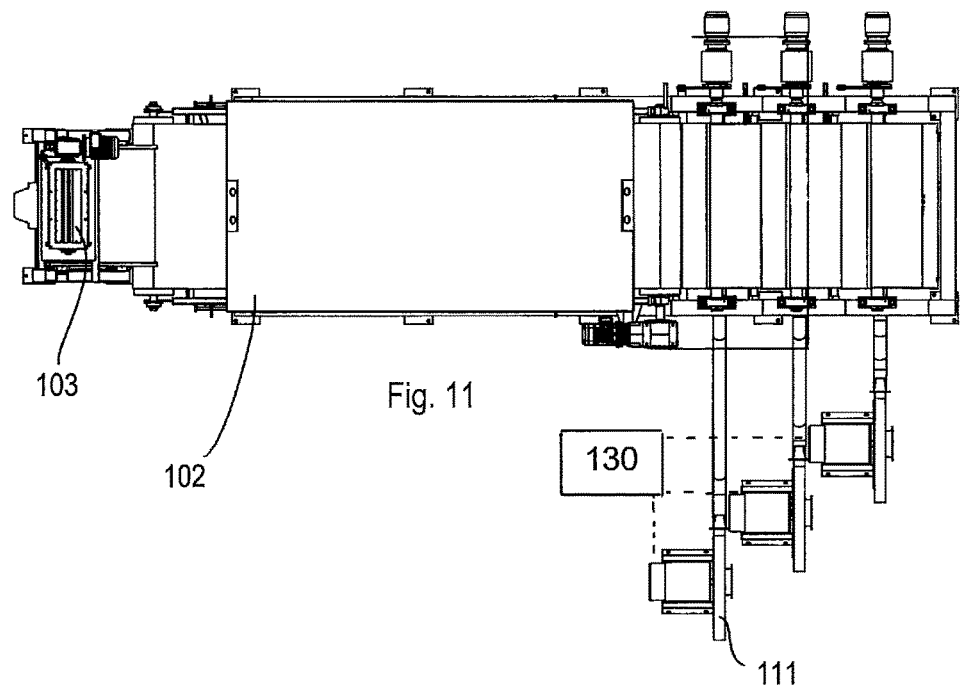
Figure 14:
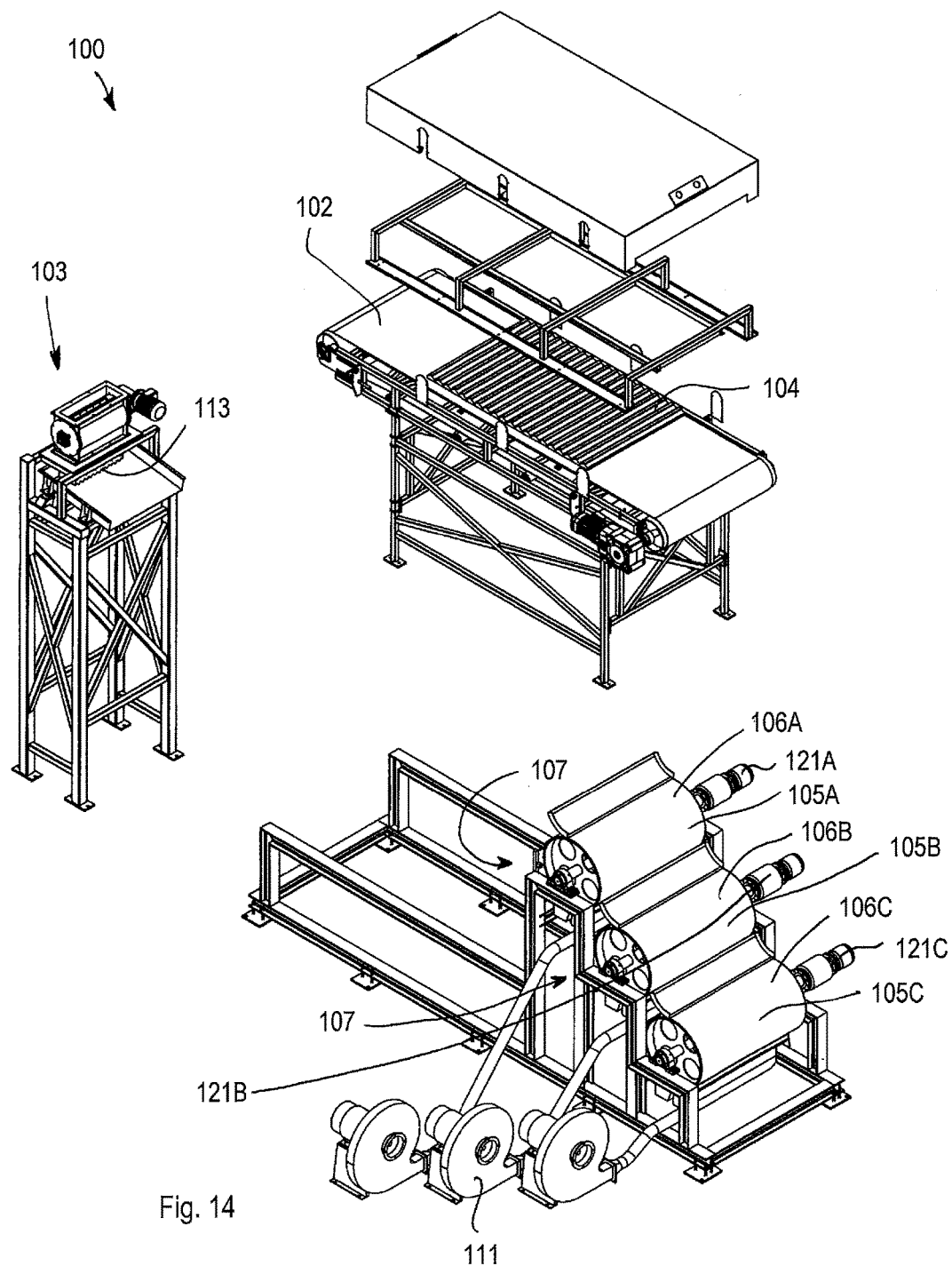
FIG. 14 is a partially exploded view of the apparatus in FIG. 8.

With reference to the annexed Figures, an apparatus 1, 100, 200, 300, 400 is shown to separate materials of various type having different softening temperature values. In other words, the apparatus 1, 100, 200, 300, 400 allows to separate and recover materials of various type based on the different respective softening temperatures.

The apparatus is thus a thermal apparatus-separator. The apparatus is particularly useful in the field of recovering and recycling materials, such as the materials coming from post-consumption plastic containers or bottles, such as polyethylene terephthalate PET and other materials, from which substances and/or further undesired contaminating materials are to be removed. Accordingly, the apparatus results to be a refiner apparatus capable of removing from a certain crushed material in granules or in flakes, the undesired substances or products which have a softening or melting temperature lower than the material to be purified.

The softening temperature is the temperature at which a number of substances achieve a certain fluidity status before reaching the step of complete melting. In other words, a plastic material at a respective softening temperature starts acquiring a soft or pasty consistency which makes the latter sticky. This soft and pasty consistency is exploited by the apparatus and method of the present invention in order to obtain a temporary adhesion of the material to a certain surface.

In the description below, reference will be made to "low-melting" materials to designate materials having a melting temperature, and thus softening temperature lower than the main material to be depurated. For example, materials such as PVC (softening temperature of 50÷70° C.) or polystyrene PS (softening temperature of 80÷90° C.)) can be considered low-melting materials as compared with the PET material to be depurated (which has a melting temperature of about 260° C.).

In the field of treatment and recycling of materials, particularly polyethylene terephthalate (PET), the objects recovered from municipal waste and comprising bottles, or container in PET are subjected to steps of washing and removal of labels, caps and other undesired bodies such as bags or others, and are then brought to a crushing or grinding step in order to be reduced in flakes. These flakes of PET often result still accompanied by particles or fragments of other materials, such as polyvinylchloride PVC, polystyrene PS, other possible polymeric materials, which must be removed in order to ensure the desired purity. At this stage, the apparatus and method according to the present invention successfully intervene, such as described below.

With reference to FIGS. 1 to 7, the apparatus 1 comprises receiving and conveying means. Particularly, the receiving and conveying means comprise support and advancing plane means 2, configured to support and advancing a blend or mixture M of flakes, or granules, fragments of different materials along a first portion of path P1, and supplying-distributing means 3 configured to pour and uniformly distribute the mixture M on said support and advancing plane means 2. In the embodiment described and illustrated herein, the support and advancing plane means comprise a conveyor belt 2, actuated by a drive motor 20. The conveyor belt 2 has a support surface of a material suitable to resist also very high temperatures without deteriorating, such as to be able to treat any recyclable plastic material. The supplying-distributing means comprise a vibrating supply unit 3 provided with a hopper element, a metering star valve 12, and an inclined distribution plane 25. The inclined distribution plane has a slope ranging between 5 and 10 degrees but can also have different values based on the characteristics of the materials being worked. The vibrating supply unit 3 is actuated and vibrated by an electric motor or electromagnet or other equivalent actuating device. The vibrating supply unit 3 is provided with a distribution element 13 having an undulated profile which functions to uniformly distribute the mixture M thereby defining a thin layer of mixture M on the conveyor belt 2.

The apparatus comprises pre-heating means 4 which are arranged to pre-heat the mixture M along said first portion of path P1, such as to prepare one or more types of materials included in the mixture M to a softening thermal action which is subsequently completed. The pre-heating means 4 are configured to irradiate thermal energy on the mixture M advancing along the first portion of path P1. The pre-heating means 4 are positioned outside the conveyor belt 2, at a certain distance from the movable support surface suitable to receive the mixture M.

The thermal energy irradiated from the pre-heating means 4 must be such as not to cause the adhesion of the low-melting materials to the conveyor belt 2, but must only prepare these low-melting materials and then promote a quicker softening of the latter which is completed in a suitable section of the apparatus 1 situated downstream of the conveyor belt 2 relative to the advancing direction of the mixture M, such as described below. In the case where the PET material is required to be treated and depurated, the pre-heating means 4 can pre-heat the mixture M at a temperature indicatively ranging between 120° C. and 160° C. The radiant power of the pre-heating means 4, and thus the pre-heating temperature, can be certainly adjusted and controlled based on specific process requirements and based on the characteristic of the materials being treated, as well as the contaminating materials being present, and then can be either lower or greater than the values stated above.

Advantageously, this configuration which provides the pre-heating means 4 arranged externally above at a certain distance from the support surface of the conveyor belt 2 achieves the technical effect of directing the heating action mainly and directly to the mixture M. The particles/fragments of mixture thereby receive the heating action in a direct manner, unlike in the prior art systems wherein it is the belt that is first heated and then it releases the heat to the mixture that is externally placed thereon. This difference is due to the fact that in the prior art systems the aim is to cause the low-melting particles to adhere directly to the conveyor belt. In this embodiment of apparatus according to the present invention, on the other hand, the adhesion of the low-melting materials should not occur on the conveyor belt 2 (where only a preparation for the adhesion is carried out) but on thermal separating means 5 placed downstream, which will be detailed herein below.

Due to the fact that the pre-heating of the mixture M is carried out externally and from above, any particles having a very low melting or softening temperature are prevented from undesirably adhering to the conveyor belt 2.

Particularly, the pre-heating means comprise infrared lamps 4 that are positioned above the conveyor belt 2 and distributed along the first portion of path P1, which are capable of irradiating thermal energy directly on the mixture M.

The distribution element 13 with undulated profile of the vibrating supply unit 3, which is particularly configured to uniformly distribute the mixture M onto the conveyor belt 2 according to a thin layer of mixture M causes all the mixture flakes, particles and fragments to be in direct contact with the conveyor belt 2 and not overlap one another. This has the effect of causing each and every particle or fragment to be exposed to the heat source and invested by the action of the infrared lamps 4, thereby being heated but not adhered to the conveyor belt 2. A control unit 10 is provided through which the infrared lamps 4 can be controlled to adjust the proper amount of energy to be irradiated according to the recyclable materials being worked.

The apparatus 1 comprises rotating thermal separating means 5, which are provided with a metal outer surface 6 suitable to receive the mixture M coming by gravity from the support and advancing plane means 2, (in this case, from the conveyor belt 2) and electromagnetic inductor heating means 7 configured to heat this metal outer surface 6 by means of electromagnetic induction.

The thermal separating means particularly comprise a cylindrical unit 5 that can be a roll or a drum, rotated by a respective drive motor 21.

The roll or drum is externally delimited by a cylindrical layer or cylindrical metal sheet, on which said outer metal surface 6 is provided. The metal which the outer cylindrical layer or outer cylindrical sheet, and hence said outer metal surface 6, consist of is steel or another metal suitable to be heated by electromagnetic induction. The cylindrical unit 5 is rotatable about a respective horizontal axis. The electromagnetic inductor means comprise an electric inductor element 7 situated at the outer metal surface 6. The electric inductor element 7 is particularly configured as a reel or electrode element extending according to a coil line, thereby defining one or more turns. The electric inductor element 7 can be nevertheless configured according to different shapes in order to fit the geometry of the cylindrical separation unit 5 and/or entire apparatus 1.

In the electric inductor element 7 an electric current is made to flow, which is alternated or in any case variable in time, which produces a time-variable magnetic field. The variation of the magnetic field flow generates an induced electromotive force in the metal layer or metal sheet of the separation roll 5 which, in turn, generates induced electric currents, i.e. parasite currents that dissipate energy in the form of heat thereby causing the immediate heating of the metal surface 6. The energy efficiency is very high, above 90%, and the energy saving is considerable. The induction heating on the surface 6 is quick and homogeneous, can be adjusted very precisely and be strictly localized on the zone of interest. The electric inductor element 7 is electrically powered by a generator with a settable power and frequency depending on several parameters, such as the geometry of the electric inductor element 7, the geometry and speed of the cylindrical separation unit 5, further possible parameters and also depending on the characteristics of the plastic material being worked which is desired to be brought to the softened condition. The provision of any measures for thermally insulating determined zones of the apparatus 1, particularly of the cylindrical unit 5, also positively affects the calibration of the electric inductor element 7, particularly reducing the absorbed power in order to obtain the desired heating temperature. In an embodiment, a thermal insulating material, which allows containing the thermal dispersions towards the inside, can be provided in the cylindrical unit 5, beneath the outer metal surface 6, thereby increasing the thermal efficacy of the system and further reducing the energy consumption.

The electromagnetic inductor means 7 are operatively connected to, and controlled by, the control unit 10, which is provided with a temperature controller, which allows adjusting the heating temperature of the metal outer surface 6 of the roll or separation drum 5 based on the specific material intended to be softened and adhered to the latter.

With reference to the first embodiment of apparatus 1, the control unit 10 actuates and adjusts the electromagnetic inductor means 7 to a softening temperature TR1 of a first specific material M1 included in the mixture M, such as to maintain this first material M1 adhering to the metal outer surface 6 along a second portion of path P2, during the rotation of the cylindrical separation unit 5. A first fraction F1 of mixture, composed of this first material M1, is thus removed from the main stream of the mixture M.

The cylindrical separation unit 5 is configured to cause, due to the rotation thereof, the fall by gravity, along a third portion of path P3, of a remaining part of mixture M which, unlike the first material M1, does not reach the softening state and thus does not stick to the metal outer surface 6. This remaining part of mixture thus defines a second fraction F2 composed of one or more materials having higher softening temperatures than the first softening temperature TR1. The flakes/particles of the second fraction F2, during the rotation of the roll or drum 5, advance to a curved downward trajectory having a slope gradually increasing to a point where the static friction force is no longer capable of holding the flakes which thus slip downwards from the metal surface 6 by gravity.

The apparatus 1 further comprises scraping means 8 to remove the first fraction F1, composed of first material M1 adhering to the outer metal surface 6, in order to send it to a dedicated collection zone R1. A cold water circuit can be provided for cooling the scraping means 8.

The scraping means 8 comprise a scraper for removal which can be a doctor-blade or spatula element or other element suitable to remove the particles/fragments of material that are stuck to the metal surface 6. The scraper 8 is located in an zone angularly spaced from the zone where the remaining part of mixture, such as the second fraction F2, detaches from the metal surface 6.

The apparatus 1 further comprises dispensing and treatment means 11, particularly a cooling unit 11 configured to cool the first fraction F1, through a jet of a cleaning-refrigerating substance X, in order to facilitate the scraping detachment operation carried out by the scraper element 8. Particularly, the cleaning-refrigerating substance X comprises air and carbon dioxide ($CO_2$) at low temperature (about $-78 \div -80°$ C.), and is directed to the first fraction F1 of mixture M to cool, solidify and crystallize the latter, such as to promote the detachment of the latter from the outer metal surface 6. The effective temperature decrease to which the material to be treated is subjected causes a quick hardening of the particles of the fraction F1 thereby making them more easily detachable from the surface they are stuck to.

The dispensing and treatment means 11 comprise one or more dispensing nozzles which act to subject the fraction F1 to treatment through the refrigerating-cleaning-substance X of air and carbon dioxide ($CO_2$). Particularly the fraction F1 is subjected to a cryogenic sandblasting treatment (also designated as "cryo-sandblasting") in which pressurized air is used which contains dry ice particles, i.e. carbon dioxide ($CO_2$) in the solid state.

The particles of solid carbon dioxide, pushed by a high-speed compressed air jet, hit the flakes, granules, fragments of material M1 thereby causing them to detach or considerably facilitate and make the next scraping step effective. A removal of the material is thereby obtained both due to a mechanical action of the dry ice particles and a synergy between cooling thermal shock and subsequent scraping action.

Advantageously, the carbon dioxide particles after the impact go back to the gaseous state and are dissolved in the air, without leaving any residual element, and thereby without altering the physical-chemical characteristics of the material being treated. Furthermore, due to the use of the air with dry ice, the surfaces of the receiving and conveying means on which the mixture M is adhered are maintained perfectly clean.

According to another embodiment, the refrigerating-cleaning-substance X comprises air and carbon dioxide in the state of carbon dioxide snow. Also in this case, the refrigerating-cleaning-substance X considerably facilitates the detachment of material from the respective surface to which it is adhered, does not leave any residues, and therefore does not alter the physical-chemical characteristics of the material being treated.

The refrigerating-cleaning-substance X can be stored in a suitable storage unit 30 included in the apparatus 1.

The dispensing and treatment means either comprise one or more nozzles 11 arranged in a stationary position, or one or more nozzles 11 mounted to a movable support, particularly translating from a zone to another in order to cover an area on which the fraction F1 of mixture is deposited, which is to be treated with said refrigerating-cleaning-substance X. The nozzle 11 is positioned upstream of the scraper 8 relative to the direction of rotation of the cylindrical separation unit 5, such as to cool, by solidification, the particles of material M1 that are about to interact with the scraper element 8. The electric inductor element 7, on the other hand, is positioned downstream of the scraper element 8 but upstream of the zone where the mixture M falling from the conveyor belt 2 comes from above. This position of the electric inductor element 7 has the technical effect of heating, immediately downstream of the scraper element 8, the subsequent portions of outer metal surface 6 which have been affected to a certain extent by the cooling action carried out by the cooling nozzle 11 and that, as soon as they have passed the scraper element 8, should be brought back again to the proper temperature before receiving again another amount of mixture M coming from the conveyor belt 2.

According to another embodiment, a cooling unit 11 can be provided comprising an impeller blower or a blower with air compressor and a respective nozzle to expel a pressurized cold air knife, the nozzle being positioned at the respective scraper element 8, which is cooled by means of a water circuit.

Due to the electromagnetic inductor element 7, the heating of said outer metal surface 6 portions is much more quick and effective, than the prior art systems. As the apparatus 1 is provided with such quick and effective heating means, the zone upstream of the scraper element 8 can be effectively and intensely cooled such that the scraping of the first material M1 can be optimized: after the scraper element 8 has been passed the cooled metal surface 6 zone is quickly brought back to the temperature suitable to cause the softening of the subsequent dose of material M1 received. Due to the above-described configuration comprising the electromagnetic inductor element 7 and the cooling unit 11, and due to the particular position and mutual arrangement of the electromagnetic inductor element 7 and the cooling nozzle, the cylindrical separation unit 5 can be easily and quickly subjected to continuous local cooling and heating cycles.

To the control unit 10 are operatively connected the drive motor 20 of the conveyor belt 2, the vibrating supply unit 3, the pre-heating means 4, the drive motor 21 of the cylindrical separation unit 5, and the electromagnetic inductor element 7. The cooling unit 11 can also be operatively connected to, and controlled by, the control unit 10. The control unit 10 intervenes to adjust, in a mutually related manner, based on the materials of the mixture M that is to be separated, the advance speed of the conveyor belt 2, the pre-heating temperature, the rotation speed and the temperature of the cylindrical separation unit 5, the vibratory movement of the vibrating supply unit 3 and the flow rate/pressure of the cleaning-refrigerating substance X that the cooling unit 11 directs to the cylindrical separation unit 5.

An operating mode of the apparatus 1, according to which a first material M1 (e.g., PVC), or a subset of low-melting materials having the same softening temperature, is separated from the remaining part of mixture, is described below.

Assuming that a mixture is mainly composed of PET flakes but also contains a certain amount of another material, such as PVC (designated with M1) the operation will be as follows.

The mixture M is continuously poured from the vibrating supply unit 3 and is uniformly distributed on the top surface of the conveyor belt 2, such as to form a thin layer of flakes/fragments/particles. A suitable vibratory frequency of the vibrating supply unit 3, a proper inclination of the inclined distribution plane 25 and the particular conformation of the undulated profile of the vibrating supply unit 3 result in the mixture flakes, particles and fragments being all distributed in direct contact with the conveyor belt 2, without overlapping one another, such as to be well exposed to the infrared lamps 4 to be pre-heated while they advance along the first portion of path P1. Additionally, by distributing the flakes and particles well scattered on the surface of the conveyor belt 2, the flakes and particles are advantageously prevented from overlapping one another on the outer metal surface 6 upon falling onto the cylindrical separation unit 5, each of the flakes and particles thus coming in contact with the metal surface. Thereby, it is ensured that all the contaminating particles to be removed will stick to the cylindrical separation unit 5 to be then scraped away therefrom.

Once the mixture M has reached the end of the conveyor belt 2, it falls by gravity onto the below-located cylindrical separation unit 5, whose outer metal surface 6 is, due to the electric inductor element 7, at a first PVC-typical softening temperature TR1. The PVC particles, which were previously pre-heated on the conveyor belt 2, adhere to the hot outer metal surface 6 upon contact therewith, remain stuck thereto due to the softening condition they have acquired and are carried, during rotation, to a second portion of path P2. A first fraction F1 of mixture M is thus separated whereas the remaining part of said mixture, which defines a second fraction F2 composed of materials having higher softening temperatures than the first softening temperature TR1, in this case composed of PET material, slips away by gravity from the surface of the cylindrical separation unit 5 following a third portion of path P3 and falling freely into a receiving zone Z located below, while the nozzle of the cooling unit 11 progressively cools the first fraction F1 before it reaches the scraper element 8 from which it is scraped and dropped into a PVC-dedicated collection zone R1. The PET being recovered is thus depurated and free of PVC traces.

FIGS. 8 to 14 show a second embodiment of the apparatus according to the invention, designated with numeral 100. The apparatus 100 comprises a number of parts similar to the first embodiment described above. These parts have been designated with the same numerals as used in the first embodiment increased by 100.

In this embodiment, the thermal separating means comprise a plurality of cylindrical units 105, which define as many separation stages. In the exemplary embodiment shown herein, three cascade-separation thermal cylindrical units 105, defining three respective separation stages for the materials of the mixture M, which are sequentially designated as first separation stage S1, second separation stage S2, and third separation stage S3. The apparatus 100 can be configured with a different desired number of separation thermal cylindrical units 105, and separation stages accordingly, based on particular usage requirements.

The apparatus 100 shown in FIGS. 8 to 14 comprises a first cylindrical unit 105A, which is located downstream of the conveyor belt 102 and is provided with a first metal surface 106A, a second cylindrical unit 105B having a second metal surface 106B and located beneath the first cylindrical unit 105A in a suitably offset position such that it can intercept those materials that fall from the first metal surface 106A. The apparatus 100 further comprises a third cylindrical unit 105C having a third metal surface 106C, which is located beneath the second cylindrical unit 105B in a suitably offset position relative to the latter such that it can intercept the materials that slip downwards from the second metal surface 106B. The three cylindrical separation units 105A, 105B, 105C are driven by respective motors 121A, 121B, 121C.

The three cylindrical separation units 105A, 105B, 105C are sequentially arranged one beneath the other, and are configured to operate at progressively increasing temperatures in order to obtain separation and collection of a plurality of materials M1, M2, M3, M4 of various type having respective progressively increasing softening temperatures. Similar to the first embodiment described above, each of the three cylindrical units 105A, 105B, 105C comprises a roll or drum, which rotates about a respective horizontal axis and a respective scraper element 108A, 108B, 108C. The electromagnetic inductor means included in the apparatus 100, comprise for each of the three cylindrical separation units 105A, 105B and 105C, a respective electric inductor element 107A, 107B, 107C. Each electric inductor element 107A, 107B, 107C is positioned downstream of the respective scraper element 108A, 108B, 108C, relative to the direction of rotation of the respective cylindrical unit 105A, 105B, 105C.

The cooling means 111 included in the apparatus 100 comprise, for each cylindrical unit 105A, 105B, 105C, one or more respective nozzles 111A, 111B, 111C at the respective scraper element 108A, 108B, 108C in order to direct one or more jets of cleaning-refrigerating substance X comprising pressurized air and carbon dioxide CO2 either in the solid state or in the state of carbon dioxide snow.

The apparatus 100 includes a control unit 110 to which the drive motor 120 of the conveyor belt 102, the vibrating supply unit 103, the pre-heating means 104, the drive motors 121A, 121B, 121C of the cylindrical separation units 105A, 105B, 105C, and the electromagnetic inductor elements 107A, 107B, 107C are operatively connected. The cooling units 111A, 111B, 111C can also be operatively connected to, and controlled by, the control unit 110. The control unit 110 acts to adjust, in a mutually correlated manner, based on the materials of the mixture M to be separated, the advance speed of the conveyor belt 102, the pre-heating temperature, the rotation speeds and the temperatures of the cylindrical separation units 105A, 105B, 105C, the vibratory movement of the vibrating supply unit 3, and the flow rates of cooling fluid that the cooling units 111A, 111B, 111C direct to the respective cylindrical separation units 105A, 105B, 105C.

An operating mode of the apparatus will be described below, which allows separating four different materials included in the mixture M: a first material M1, a second material M2, a third material M3 and a fourth material M4 having respective progressively increasing softening temperatures. Also in this case, for clarity, the fourth material M4 can comprise PET, and the other materials can comprise "low-melting" products such as PVC, polystyrene, acrylic materials or others to be separated from PET.

In the first steps, the operation is similar to that of the first embodiment of a single separation stage-apparatus. The first cylindrical unit 105A is heated to a first lower temperature to remove first the most "low-melting" material. The second cylindrical unit 105B is heated to a second temperature higher than said first temperature associated with the first cylindrical unit 105A. The third cylindrical unit 105C is heated to a third temperature higher than said second temperature associated with the second cylindrical unit 105B.

The second fraction F2 that does not adhere to the first cylindrical unit 105A and falls along a third portion of path P3, in this case, may also contain in addition to PET contaminating materials that were not removed during the first separation stage S1 because having a higher softening temperature than the first softening temperature TR1. The second fraction F2 falls onto the second cylindrical separation unit 105B, to undergo the second separation stage S2, in a similar manner as performed by the first stage S1, and is directed to a second collection zone R2 following a fourth portion of path P4. During the second separation stage S2, a third fraction F3 is then removed from the mixture, which fraction is composed of a second material M2 that is scraped away and collected into the suitable collection zone R2 following the fourth portion of path P4. The remaining part of mixture, i.e. a fourth fraction F4 composed of materials having softening temperatures higher than the second softening temperature TR2 slips downwards by gravity from the second metal surface 106B of the second unit 105B thus falling freely to a subsequent receiving zone Z' located below, where it is intercepted by the outer metal surface 106C of the third cylindrical separation unit 105C, and follows a fifth portion of path P5. From this fourth fraction F4 of mixture a fifth fraction F5 is removed, which is composed of a third material M3, which adheres to the third metal surface 106C and is subsequently scraped and collected in the third collection zone R3. The last remaining fraction of mixture, composed of material M4 falls freely from the third metal surface 106C to be thereby recovered in high purity conditions.

Figure 15:
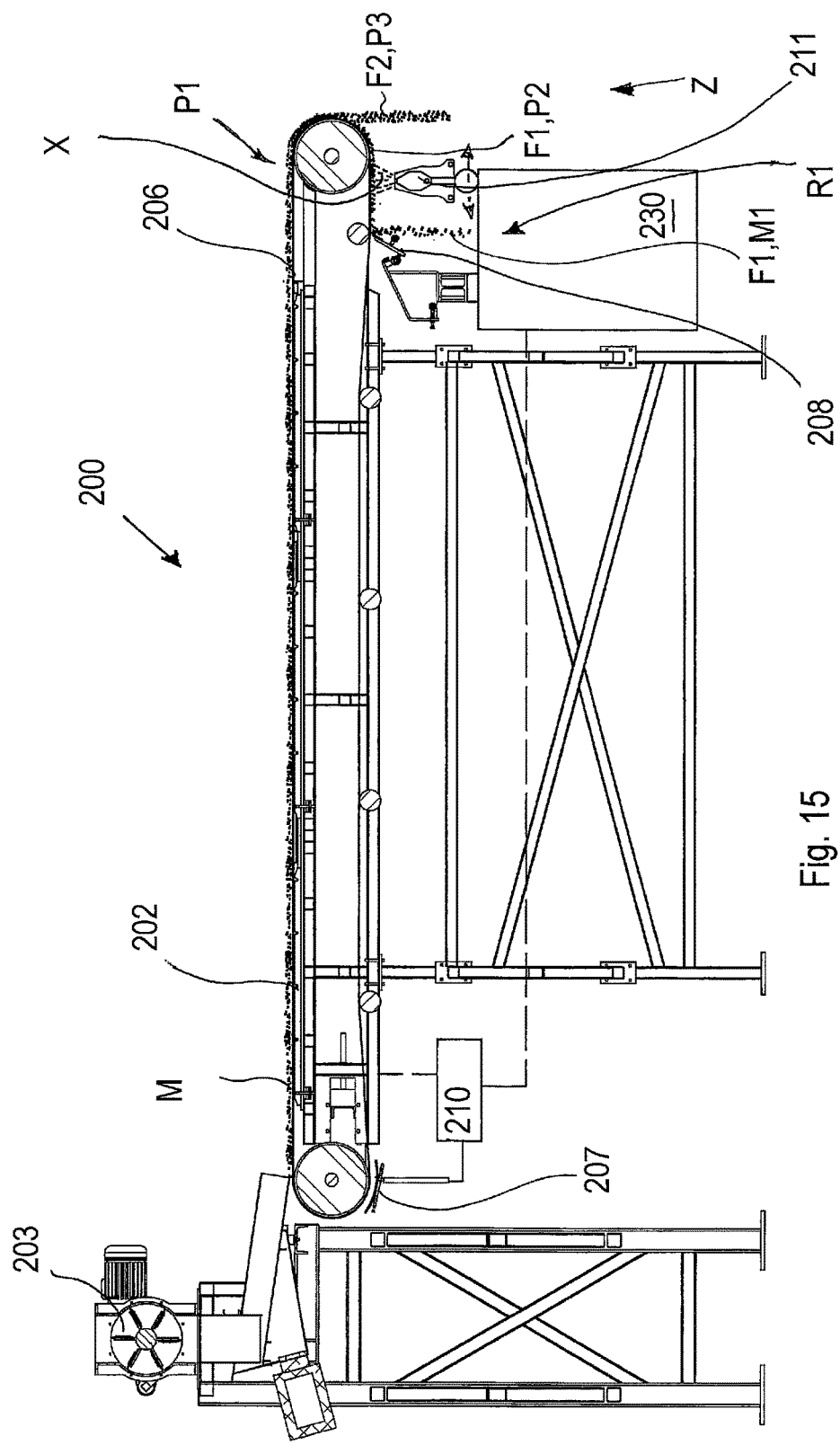
FIGS. 15, 16, 17 show further embodiments of the apparatus.

The apparatus 200 embodiment shown in FIG. 15 differs from the above-described embodiments in that the receiving and conveying means only comprise a conveyor belt 202, having a metal support surface 206. An electromagnetic inductor 207 is provided, which is located upstream of the receiving zone of the mixture M to heat by means of electromagnetic induction the metal outer surface 206 at the first softening temperature TR1 in order to adhere the first fraction F1 thereto which contains the first material M1. A dispensing and treatment unit 211 is further provided, with relevant storage tank 230, for the cleaning-refrigerating substance X.

The operation of the apparatus 200 is similar to that described in the above embodiments, and the conveyor belt 202 acts in a similar manner as the cylindrical unit 5 either with roll or drum of the first embodiment of apparatus described above.

Figure 16:
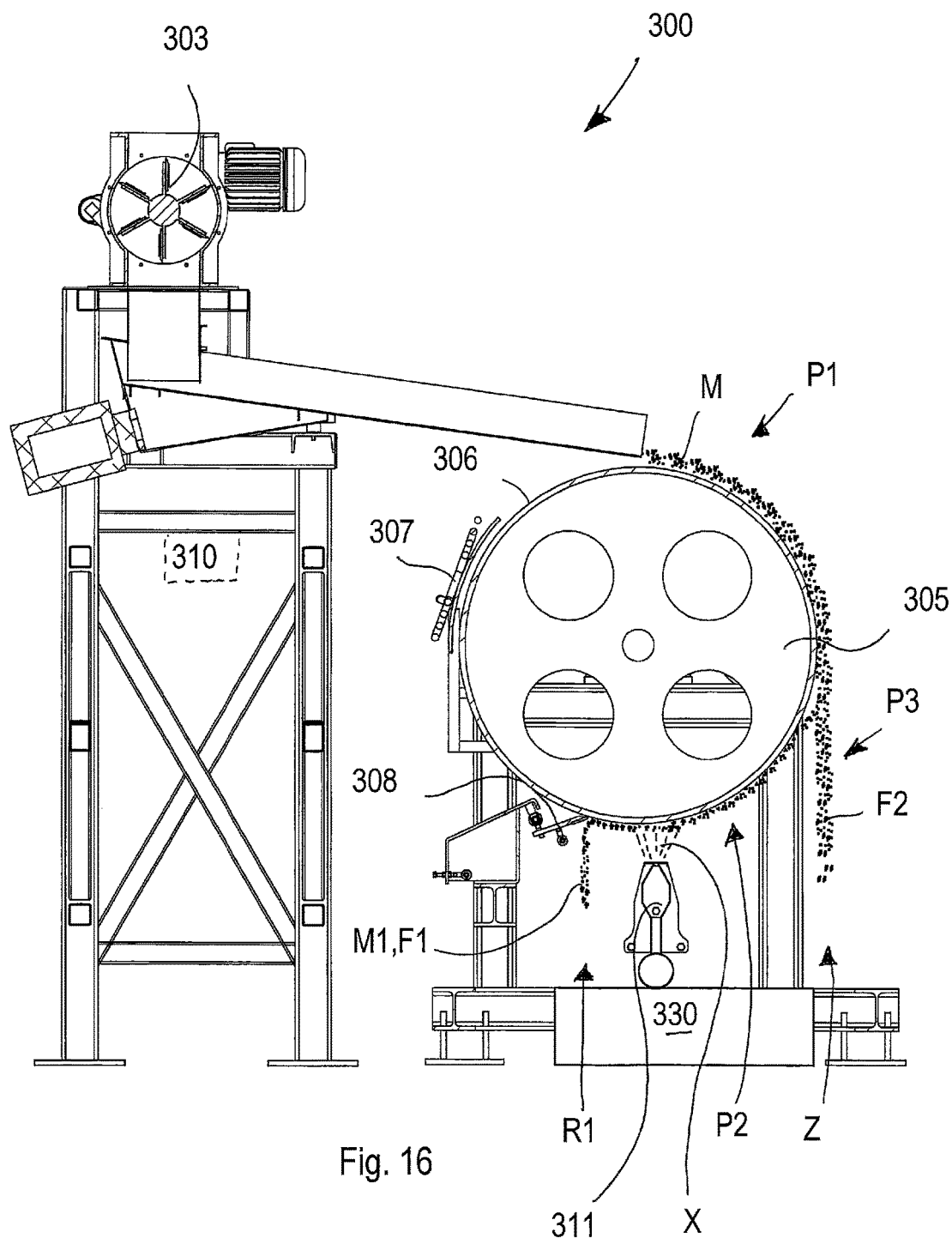

The embodiment of apparatus 300 shown in FIG. 16 differentiates from the embodiments described above in that the receiving and conveying means comprise only one thermal separation unit 305 either with roll or drum, which is provided with a metal support surface 306. An electromagnetic inductor 307 is also provided, which is placed upstream of the receiving zone of the mixture M in order to heat by electromagnetic induction the metal outer surface 306 to the first softening temperature TR1, such that the first fraction F1 containing the first material M1 adheres thereto. A dispensing and treatment unit 311 is also provided, with a relative storage tank 330, for the cleaning-refrigerating substance X.

The operation of the apparatus 300 is similar to that described in the above embodiments.

Figure 17:
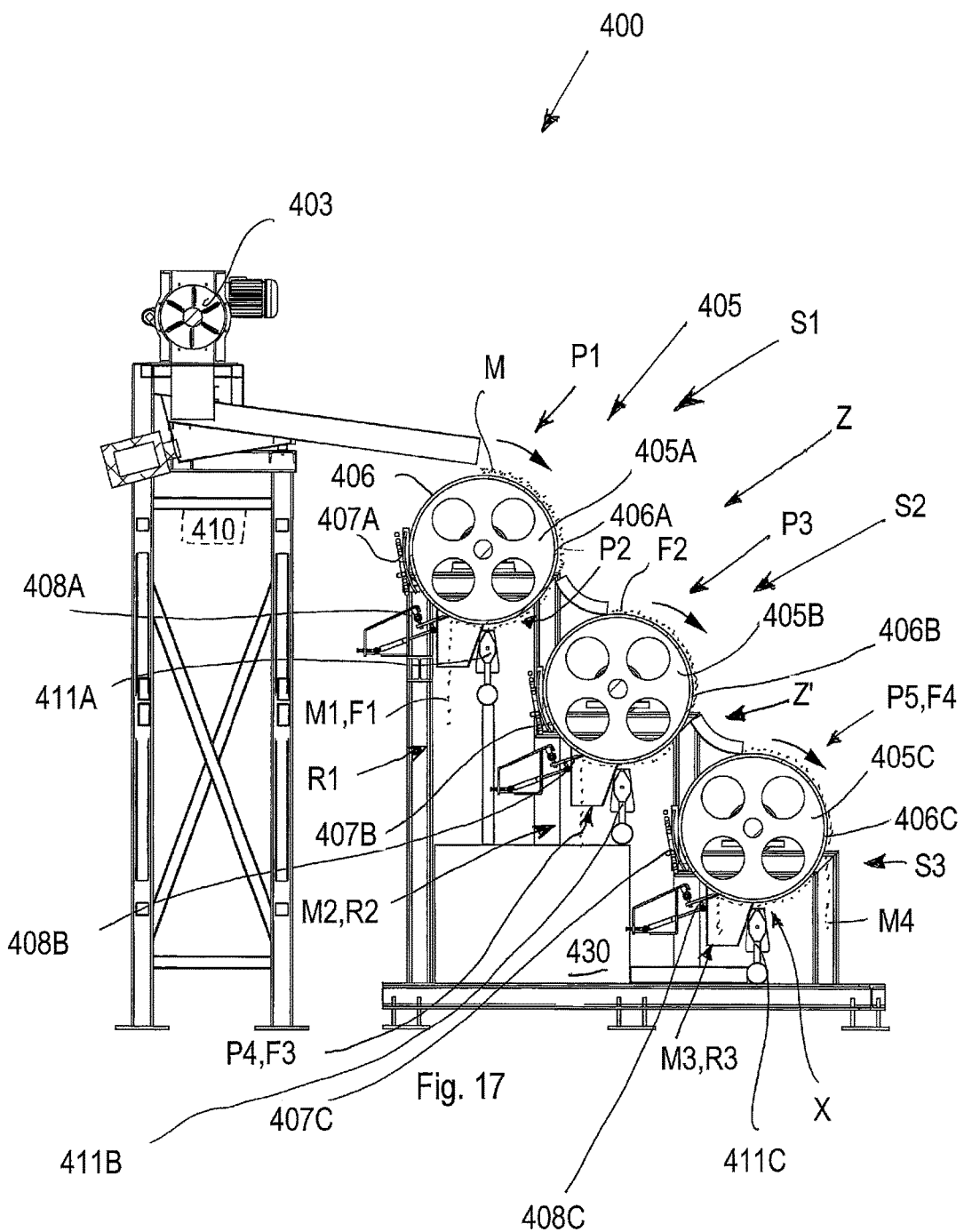

FIG. 17 shows a further embodiment of apparatus 400 which operates in a similar manner as the above embodiments but differs in that the receiving and conveying means are not provided with conveyor belt and comprise three cylindrical thermal separation units 405A, 405B, 405C, which define as many separation stages (S1, S2, S3) being arranged in cascade one over the other and configured to operate at progressively increasing temperatures in order to obtain a separation and collection of a plurality of various types of materials (M1, M2, M3, M4) having respective progressively increasing softening temperatures. Each cylindrical unit 405A, 405B, 405C, is rotatable about a respective horizontal axis, is provided with a respective metal outer surface 406A, 406B, 4056C and a scraper element 408A, 408B, 408C, as well as with a respective electric inductor element 407A, 407B, 407C positioned downstream of a respective scraper element 408A, 408B, 408C relative to the direction of rotation of the respective cylindrical unit 405A, 405B, 405C.

To each cylindrical unit 405A, 405B, 405C, one or more nozzles 411A, 411B, 411C are associated for dispensing the cleaning-refrigerating substance X, similarly to what has been described above.

From what has been described and shown in the annexed drawings, it is understood that the method and apparatus described above allow obtaining very high efficacy in the separation of the various materials in the recycling process, very high levels of purity in the plastic material recovered. and allows a considerably reduced energy consumption, due to the particular configuration of the cylindrical thermal units coupled to the electromagnetic inductor heating means. The apparatus described herein results in a thermal apparatus with an operating principle based on the use of different melting temperature values, or more precisely softening of the materials.

Several tests have been conducted, for example with a power of the electromagnetic inductor means set to a value of about 15 Kw, and with temperatures lower than 200° C. to heat a 1 meter-diameter cylindrical separation drum, which have proved the efficacy of material separation, with purity levels of the PET material near to 100%, and the considerable energy saving associated therewith. By means of a suitable optimization of the geometries of the various parts of the apparatus, particularly the cylindrical thermal separation units and inductor elements, and by the adoption of suitable thermal insulation measures, a very high process performance can be obtained, thereby allowing the use of even lower powers necessary for operation.

From what has been described and illustrated above, it is understood that the apparatus 1, 100 is also configured as a refining apparatus for PET or other materials. Similarly, the method can be also defined as a method for refining a material, such as recyclable PET.

The induction heating that is obtained by means of electromagnetic inductor means 7, 107 has the advantage of preventing gas and heat dispersion, preventing the generation of flames and this also results in a general improvement in the workplace conditions for the operators, in addition to a limited environmental impact.

It should be understood that what has been said and shown with reference to the annexed drawings has been provided by way of illustration only of the general characteristics of the separation method and apparatus according to the present invention; accordingly, other modifications or embodiments can be made both to the method and the apparatus, either as a whole or parts thereof, without however departing from the claims below. Particularly, the geometrical conformation, dimensions, position, materials composing one or more parts of the apparatus can be suitably selected and/or optimized based on specific usage requirements.

The invention claimed is:

1. Method for separating materials of various type having different softening temperature values, comprising:
 a) pouring a mixture of flakes and fragments of said materials onto movable receiving and conveying means in a uniformly distributed manner, and
 b) advancing said mixture along a first portion of path;
 c) activating electromagnetic inductor means to heat by electromagnetic induction an outer metal surface, included in said movable receiving and conveying means, such as to reach a first lower softening temperature corresponding to a first material included in said mixture,
 d) subjecting said mixture to a separating action in which a first fraction of said mixture, composed of said first material, adheres to said outer metal surface due to the soft or pasty consistency thereof acquired upon contact with said outer metal surface that is heated to said first softening temperature, said first fraction of mixture remaining stuck to said outer metal surface along a second portion of path whereas the remaining part of said mixture, defining a second fraction composed of materials having softening temperatures higher than said first softening temperature, slips away from said outer metal surface by gravity along a third portion of path and falls freely to a receiving area located below,
 e) removing by scraping said first fraction of mixture from said outer metal surface and receiving said removed first fraction in a collection zone separated from said receiving zone and dedicated to said first material, and
 (f) before said removing, directing a jet of refrigerating-cleaning-substance containing air and carbon dioxide at low temperature to said first fraction of mixture advancing along said second portion of path, such as to cool and solidify said first fraction of mixture in order to promote the detachment thereof from said outer metal surface.

2. Method according to claim 1, wherein said directing provides a cryogenic sandblasting action with a refrigerating-cleaning-substance containing air and particles of carbon dioxide in the solid state.

3. Method according to claim 1, wherein said refrigerating-cleaning-substance comprises:
 air and carbonic snow.

4. Method according to claim 1, wherein said step b) comprises:
 feeding said mixture along said first portion of path by a conveyor belt provided with a support surface on which said mixture is uniformly distributed.

5. Method according to claim 4, wherein said conveyor belt, having a metal support surface, is heated by electromagnetic induction to said first softening temperature downstream of the scraping zone and upstream of the zone wherein said mixture is poured, such as to adhere said first fraction of mixture to said metal support surface and to leave the remaining part of mixture to fall by gravity along said third portion of path, and wherein it is provided to treat said first fraction with said refrigerating-cleaning-substance along said second portion of path to promote the subsequent scraping step e).

6. Method according to claim 1, wherein said movable receiving and conveying means comprise:
 rotating cylindrical thermal separating means having an outer metal surface that is heated by electromagnetic induction in order to selectively hold one or more specific materials included in said mixture.

7. Method according to claim 6, wherein said steps a) to f) define a first separation stage, said rotating cylindrical thermal separating means having a first cylindrical rotating unit on which said outer metal surface is provided, and wherein said second fraction of mixture obtained during said step d), is subjected to a second separation stage, which comprises the following steps of:
 f) heating through electromagnetic induction, to a second softening temperature higher than said first softening temperature and associated with a second material included in said mixture, a subsequent metal surface provided on a second cylindrical rotating unit of said cylindrical rotating thermal separating means, said second unit being located below said first cylindrical rotating unit at said receiving zone, g) intercepting, in said receiving zone, said second fraction which is separated by gravity from said metal surface, such as to receive said second fraction on said subsequent metal surface, such that a third fraction of said mixture, composed of said second material, adheres to said subsequent outer metal surface due to the soft or pasty consistency thereof caused by heating at said second softening temperature, said third fraction of mixture remaining stuck to said subsequent outer metal surface along a fourth portion of path whereas the remaining part of mixture defining a fourth fraction composed of materials having softening temperatures higher than said second softening temperature slips away by gravity from said second cylindrical rotating unit and falls freely to a subsequent receiving zone located below and following a fifth portion of path, and h) treating with said refrigerating-cleaning-substance and removing by scraping away said third fraction of mixture from said subsequent outer metal surface and receiving, once it has been removed, said third fraction in a respective collection zone dedicated to said second material.

8. Method according to claim 7, wherein said fourth fraction of mixture is subjected to one or more subsequent separation stages with progressively increasing heating temperatures, wherein the use of one or more additional cylindrical rotating units is correspondingly provided, which units are included in said cylindrical rotating thermal separating means that have respective outer metal surfaces and co-operate with respective electrical heating inductor elements, with units for delivering said cleaning-refrigerating substance e with scraping elements, such as to obtain a cascade separation and selection of distinct materials having respective progressively increasing softening temperatures.

9. Method according to claim 4, wherein said mixture is provided to be pre-heated on said conveyor belt to a pre-heat temperature lower than said first softening temperature in order to prepare one or more types of materials included in said mixture to a thermal softening action, and wherein said mixture is provided to be progressively transferred by gravity from said conveyor belt to said cylindrical rotating thermal separating means.

10. Method according to claim 1, wherein said mixture is composed of recycling materials reduced in fragments or flakes obtained from post-consumption bottles and containers that were previously subjected to washing and grinding operations, wherein said materials comprise polyethylene terephthalate, and other contaminating materials and products to be removed.

11. Method according to claim 1, comprising:
controlling in a correlated manner, based on the typologies and characteristics of the materials included in said mixture, parameters including:
the advance/rotation speed of said movable receiving and conveying means,
the pre-heating temperature along said first portion of path, and
the heating temperature obtained by said electromagnetic inductor means,
the vibratory motion of the supplying-distributing means used to uniformly pour said mixture onto said receiving and conveying means, and
the flow-rate and/or pressure of the jets of said cleaning-refrigerating substance.

12. Apparatus for separating materials of different types having different softening temperature values, comprising:
receiving and conveying means configured to support and advance a mixture of flakes and fragments of said materials along a first portion of path, and having a metal outer surface suitable to receive said mixture;
supplying-distributing means configured to pour and uniformly distribute said mixture onto said receiving and conveying means,
heating electromagnetic inductor means for heating said metal outer surface by electromagnetic induction, such as to reach a first lower softening temperature corresponding to a first material included in said mixture;
control means to actuate and adjust said electromagnetic inductor means to a softening temperature of a first material included in said mixture, such as to maintain the adhesion of said first material to said metal outer surface along a second portion of path due to the soft or pasty consistency acquired by the heating action,
scraping means to remove a first fraction of mixture composed of said first material from said metal outer surface in order to direct it to a dedicated collection zone;
said receiving and conveying means being configured to cause, during the advancement, the fall by gravity, along a third portion of path, of a remaining part of mixture defining a second fraction composed of one or more materials having softening temperatures higher than said first softening temperature,
and
dispensing and treatment means configured to direct a jet of refrigerating-cleaning-substance containing air and carbon dioxide at low temperature to said first fraction of mixture advancing along said second portion of path, in order to cool and solidify said first fraction of mixture such as to promote the detachment of the latter from said outer metal surface.

13. Apparatus according to claim 12, wherein said dispensing and treatment means comprise:
one or more nozzles arranged in a stationary position, or one or more nozzles mounted to movable support means in order to cover an area to be treated with said refrigerating-cleaning-substance, said one or more nozzles being positioned upstream of said scraping means relative to the advance direction of said receiving and conveying means.

14. Apparatus according to claim 12, wherein said dispensing and treatment means are configured to expel a refrigerating-cleaning-substance containing air and particles of carbon dioxide in the solid state for the cryogenic sandblasting treatment of said mixture.

15. Apparatus according to claim 12, wherein said dispensing and treatment means are configured to expel a refrigerating-cleaning-substance containing air and carbonic snow.

16. Apparatus according to claim 12, wherein said dispensing and treatment means comprise:
a storage unit for said cleaning-refrigerating substance.

17. Apparatus according to claim 12, wherein said receiving and conveying means comprise:
a conveyor belt.

18. Apparatus according to claim 17, wherein said conveyor belt has a metal support surface and wherein said electromagnetic inductor means comprise:
an electromagnetic inductor placed upstream of the receiving zone of the mixture to heat said metal outer surface by electromagnetic induction to a first softening temperature in order to adhere a first fraction containing a first material of said mixture to said outer metal surface, and wherein dispensing and treatment means are provided, which are arranged to dispense said cleaning-refrigerating substance upstream of said first fraction scraping zone.

19. Apparatus according to claim 12, wherein said receiving and conveying means comprise:
cylindrical rotating thermal separating means having an outer metal surface that can be heated at a desired temperature by means of said electromagnetic inductor means in order to selectively retain one or more specific materials included in said mixture (M).

20. Apparatus according to claim 19, wherein said cylindrical rotating thermal separating means comprise:
a cylindrical unit, configured as a roll or a drum, rotating about a horizontal axis, on which said metal outer surface is provided, and wherein said electromagnetic inductor means are positioned downstream of said scraping means, and upstream of the zone where the mixture comes from above.

21. Apparatus according to claim 19, wherein said cylindrical rotating thermal separating means comprise:
a plurality of cylindrical units defining a plurality of separation stages arranged in cascade one over the other and configured to operate at progressively increasing temperatures in order to obtain a separation and collection of a plurality of materials of various type having respective progressively increasing softening temperatures.

22. Apparatus according to claim 21, wherein each cylindrical unit, configured as a roll or drum, is rotatable about a respective horizontal axis, is provided with a respective metal outer surface and a scraper element, and wherein said electromagnetic inductor means comprise, for each cylindrical separation unit:
an electric inductor element positioned downstream of the respective scraper element, relative to the direction of rotation of the respective cylindrical unit.

23. Apparatus according to claim 21, wherein said cooling means comprise, for each cylindrical unit:
one or more nozzles situated at a respective scraper element.

24. Apparatus according to claim 12, comprising:
pre-heating means including infrared lamps distributed for pre-heating said mixture along said first portion of path to prepare one or more types of materials included in said mixture to a thermal softening action.

25. Apparatus according to claim 12, wherein said supplying-distributing means comprise:
a vibrating supply unit provided with a metering star valve, an inclined distribution plane, and a distribution element having an undulated profile for uniformly distributing said mixture onto said conveyor belt.

26. Apparatus according to claim 12, wherein said control means are operatively connected to:
drive motor means of said receiving and conveying means, to
said supplying-distributing means, to
said pre-heating means, to
said electromagnetic inductor means, and to
said dispensing and treatment means and are configured to adjust, in a mutually correlated manner, based on the materials of said mixture, the advance speed of said receiving and conveying means the possible pre-heating temperature the vibratory motion of said supplying-distributing means, and the flow-rate and/or pressure of said cleaning-refrigerating substance.

* * * * *